UNITED STATES PATENT OFFICE.

DANIEL CHARLESTON, OF MELBOURNE, VICTORIA, AUSTRALIA.

COMPOUND FOR SEALING PUNCTURES IN PNEUMATIC TIRES.

No. 832,841.                    Specification of Letters Patent.                    Patented Oct. 9, 1906.

Application filed October 5, 1905. Serial No. 281,423.

*To all whom it may concern:*

Be it known that I, DANIEL CHARLESTON, a subject of the King of Great Britain and Ireland, residing at 226 Elizabeth street, Melbourne, in the county of Bourke, State of Victoria, and Commonwealth of Australia, have invented a certain new and useful Compound for Sealing Punctures in Pneumatic Tires and the Like, of which the following is a specification.

The object of my invention is to provide a mixture or compound which when placed in the air-tube of a pneumatic tire or the like or elastic tubes or rubber articles inflated by air will instantly seal any puncture or punctures made therein.

The mixture or compound is cheap in first cost, simple and efficient in operation, and can be introduced into an air-tube of a pneumatic tire or tube or rubber article without calling for skill in the operation. In the past a variety of mixtures, compositions, and solutions have been used to this end; but they have been either expensive in first cost or unreliable or faulty in operation. With my invention, however, these defects have been overcome.

My improved sealing compound is made up of the following ingredients: gum-ammoniacum, gum-thus americanum, water, and pyoktanin.

In lieu of the gum-ammoniacum I may employ one of the following gums: asafetida, olibanum, copal, opopanax, mastic, shellac, (orange or white.) Preferably I use the gums ammoniacum and thus-americanum, as I find the best results are thereby attained.

The ingredients are mixed in suitable proportions, dependent upon the climate and the conditions surrounding their use; but under most circumstances the best results are obtained when used in the following approximate proportions: gum-ammoniacum, forty parts, more or less; gum-thus americanum, 19.85 parts, more or less; water, forty parts, more or less; pyoktanin, .15 parts, more or less.

To prepare my compound, the gums ammoniacum and thus-americanum are both preferably reduced to a powder, which powder is placed in a suitable receptacle and well mixed together. When they have been thoroughly mixed and commingled, the water is added and finally the pyoktanin. After being again thoroughly stirred and mixed the compound is bottled or placed in suitable receptacles and is ready for use.

The compound is introduced into the air-tube of a pneumatic tire through the ordinary air-inlet of the same, the tire being in a deflated state for the purpose. The compound spreads around the interior of the tube, which is then inflated in the customary way. When an air-tube is punctured, the air rushes to the aperture made therein and carries with it a percentage of the compound. This entering the aperture instantaneously closes the same, and thereby seals the puncture.

What I claim is—

1. The improved sealing compound for pneumatic tires and like inflatable objects, consisting of a suitable gum-resin, thus americanum, water and an anilin dye.

2. The herein-described self-sealing puncture composition for pneumatic tires and other inflatable objects, comprising gum-ammoniacum, gum-thus americanum, water, and an anilin dye.

3. The herein-described compound for sealing punctures in pneumatic tires and other rubber articles inflated by air consisting of gum-ammoniacum, gum-thus americanum, water and pyoktanin.

4. The herein-described compound for sealing punctures in pneumatic tires and like rubber articles inflated by air, consisting of gum-ammoniacum forty parts (more or less), gum-thus americanum 19.85 parts (more or less), water forty parts (more or less), and pyoktanin .15 parts (more or less) prepared in the manner hereinbefore described.

5. The herein-described compound for sealing punctures in pneumatic tires and other elastic tubes or rubber articles inflated by air consisting of the following ingredients and mixed in the following approximate proportions: gum-resin forty parts (more or less) and gum-thus americanum 19.85 parts, water forty parts (more or less) prepared in the manner hereinbefore described.

6. A self-sealing compound for pneumatic tires and the like consisting of a suitable gum-resin, thus americanum and water.

7. A self-sealing puncture compound for pneumatic tires and the like, consisting of gum-ammoniacum, gum-thus americanum, and water.

In testimony whereof I affix my signature in the presence of two subscribing witnesses.

DANIEL CHARLESTON.

Witnesses:
CECIL M. PLASTRIN,
GEORGE A. MCKEN.